No. 887,056.  PATENTED MAY 12, 1908.
P. P. BARTHOL.
MACHINE FOR MAKING TABS.
APPLICATION FILED JAN. 30, 1903.

7 SHEETS—SHEET 1.

Witnesses,
W. H. Palmer
Emily F. Otis

Inventor,
Paul P. Barthol.
by Lothrop & Johnson
his Attorneys.

No. 887,056. PATENTED MAY 12, 1908.
P. P. BARTHOL.
MACHINE FOR MAKING TABS.
APPLICATION FILED JAN. 30, 1903.

7 SHEETS—SHEET 2.

Witnesses,
W. H. Palmer
Emily F. Otis

Inventor,
Paul P. Barthol.
by Lothrop & Johnson
his Attorneys

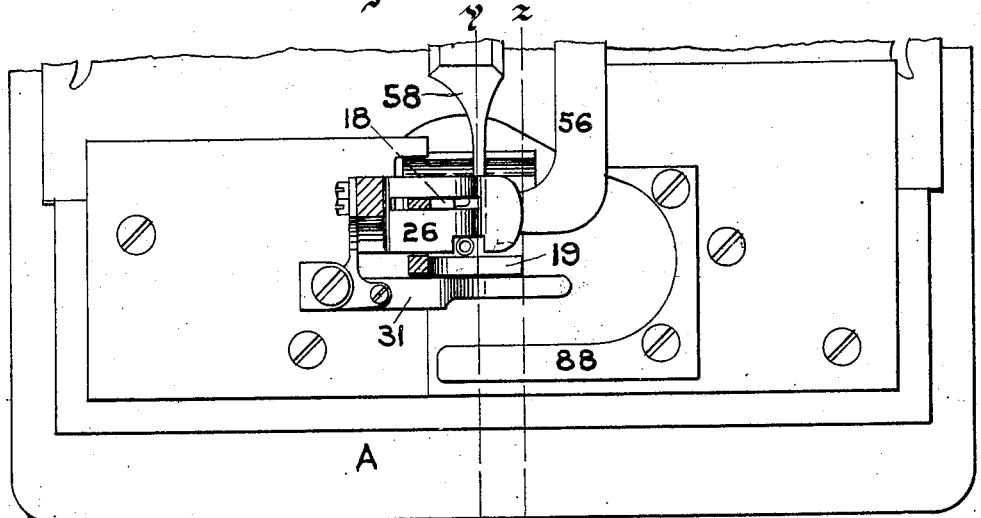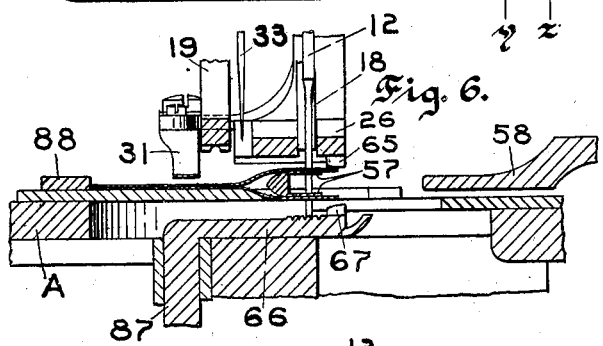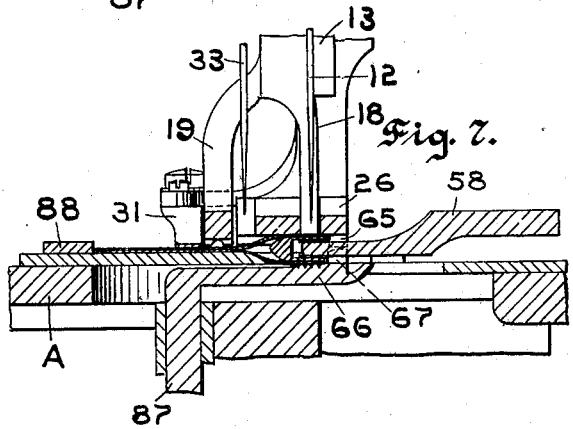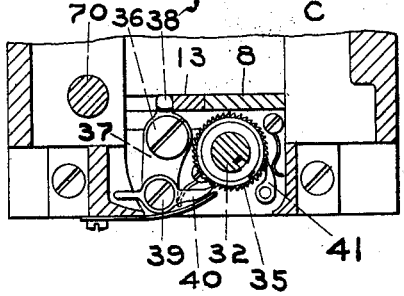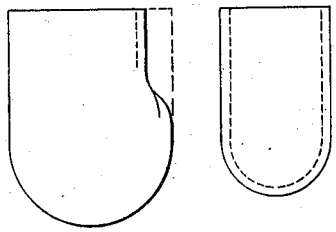

No. 887,056. PATENTED MAY 12, 1908.
P. P. BARTHOL.
MACHINE FOR MAKING TABS.
APPLICATION FILED JAN. 30, 1903.
7 SHEETS—SHEET 4.
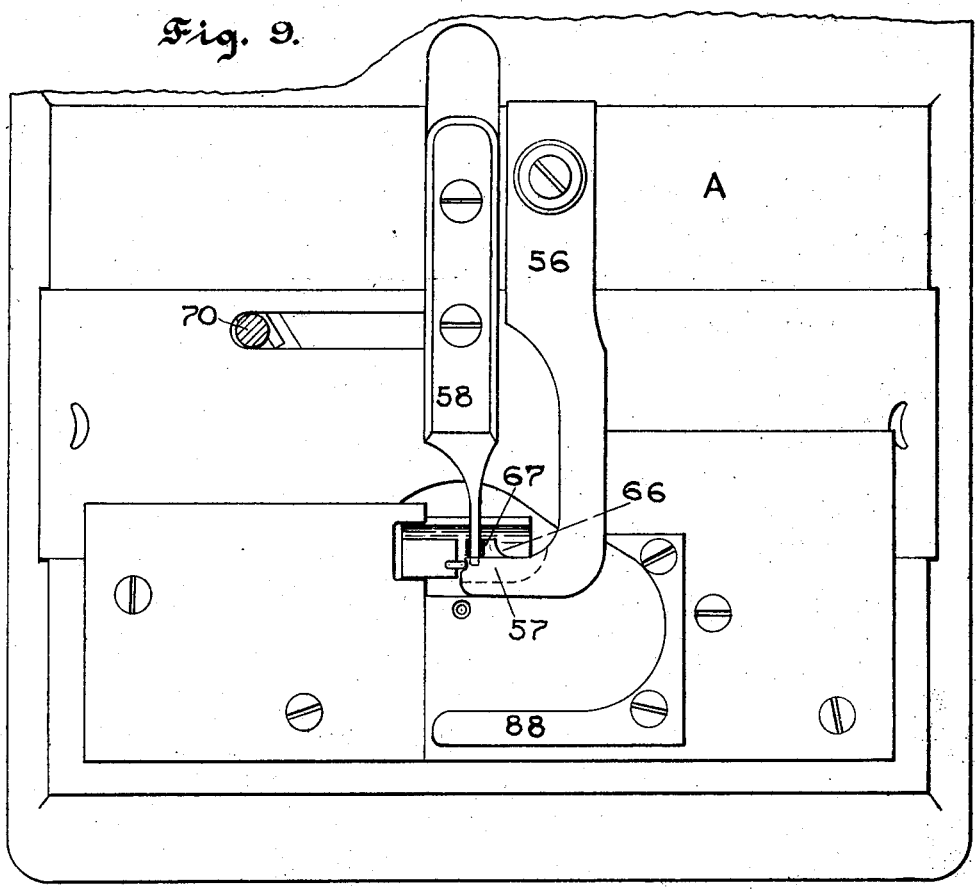
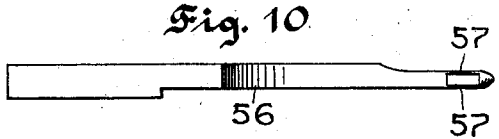 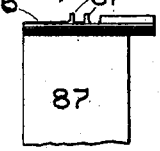 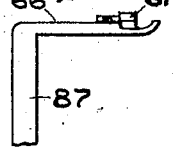
Witnesses,
W. H. Palmer.
Emily F. Otis
Inventor,
Paul P. Barthol.
by Lothrop & Johnson
his Attorneys.

No. 887,056.

PATENTED MAY 12, 1908.

P. P. BARTHOL.
MACHINE FOR MAKING TABS.
APPLICATION FILED JAN. 30, 1903.

7 SHEETS—SHEET 5.

Witnesses,
W. H. Palmer
Emily F. Otis

Inventor,
Paul P. Barthol.
by Lothrop & Johnson
his Attorneys.

No. 887,056. PATENTED MAY 12, 1908.
P. P. BARTHOL.
MACHINE FOR MAKING TABS.
APPLICATION FILED JAN. 30, 1903.
7 SHEETS—SHEET 6.
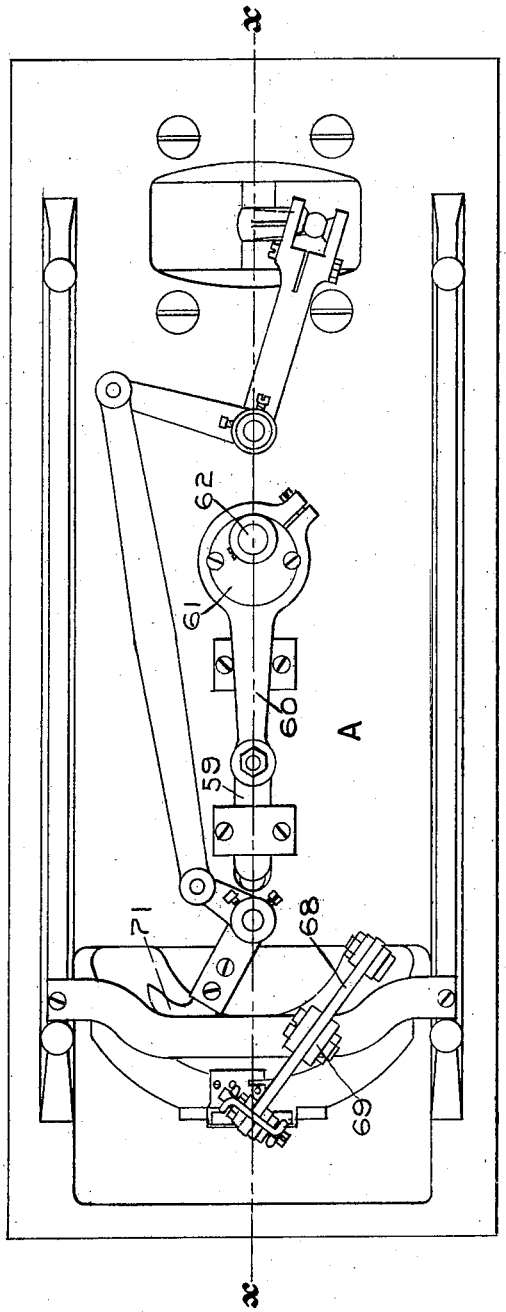
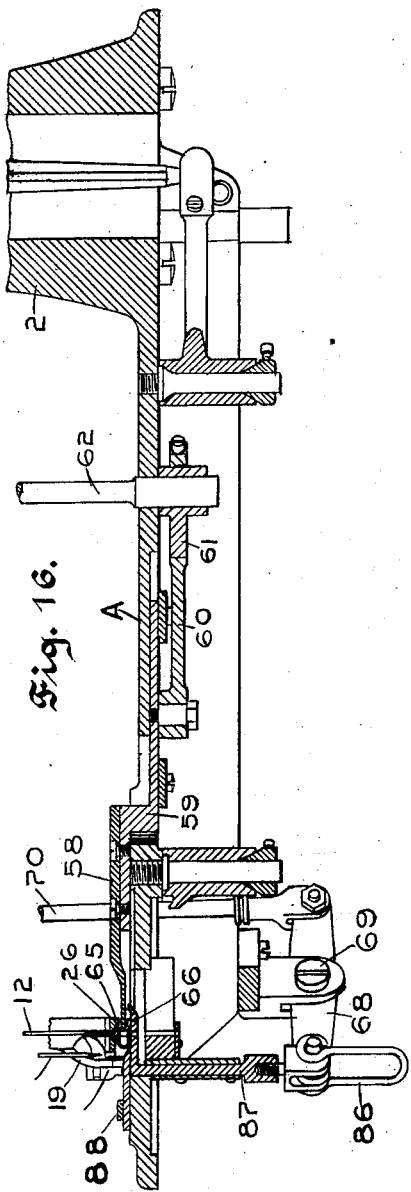
Witnesses
W. H. Palmer
Emily F. Otis
Inventor,
Paul P. Barthol.
by Lothrop & Johnson
his Attorneys.

No. 887,056. PATENTED MAY 12, 1908.
P. P. BARTHOL.
MACHINE FOR MAKING TABS.
APPLICATION FILED JAN. 30, 1903.

7 SHEETS—SHEET 7.

Witnesses,
W. N. Palmer
Emily F. Otis

Inventor,
Paul P. Barthol.
by Lothrop & Johnson
his Attorneys.

UNITED STATES PATENT OFFICE.

PAUL P. BARTHOL, OF ST. PAUL, MINNESOTA, ASSIGNOR, BY MESNE ASSIGNMENTS, TO THE AMERICAN TURNING & SEWING MACHINE COMPANY, A CORPORATION OF MINNESOTA.

MACHINE FOR MAKING TABS.

No. 887,056.  Specification of Letters Patent.  Patented May 12, 1908.

Application filed January 30, 1903. Serial No. 141,210.

*To all whom it may concern:*

Be it known that I, PAUL P. BARTHOL, a citizen of the United States, residing at St. Paul, in the county of Ramsey and State of Minnesota, have invented certain new and useful Improvements in Machines for Making Tabs, of which the following is a specification.

My invention relates to improvements in machines for turning inward the edges of two or more plies of material and stitching said plies through their inturned edges, its object being particularly to provide means in connection with the turning and sewing mechanism for swinging the plies to permit the making of articles having a curved edge, such as link cuff-tabs.

To this end my invention consists in the features of construction and combination hereinafter specifically described and claimed.

Figure 1:
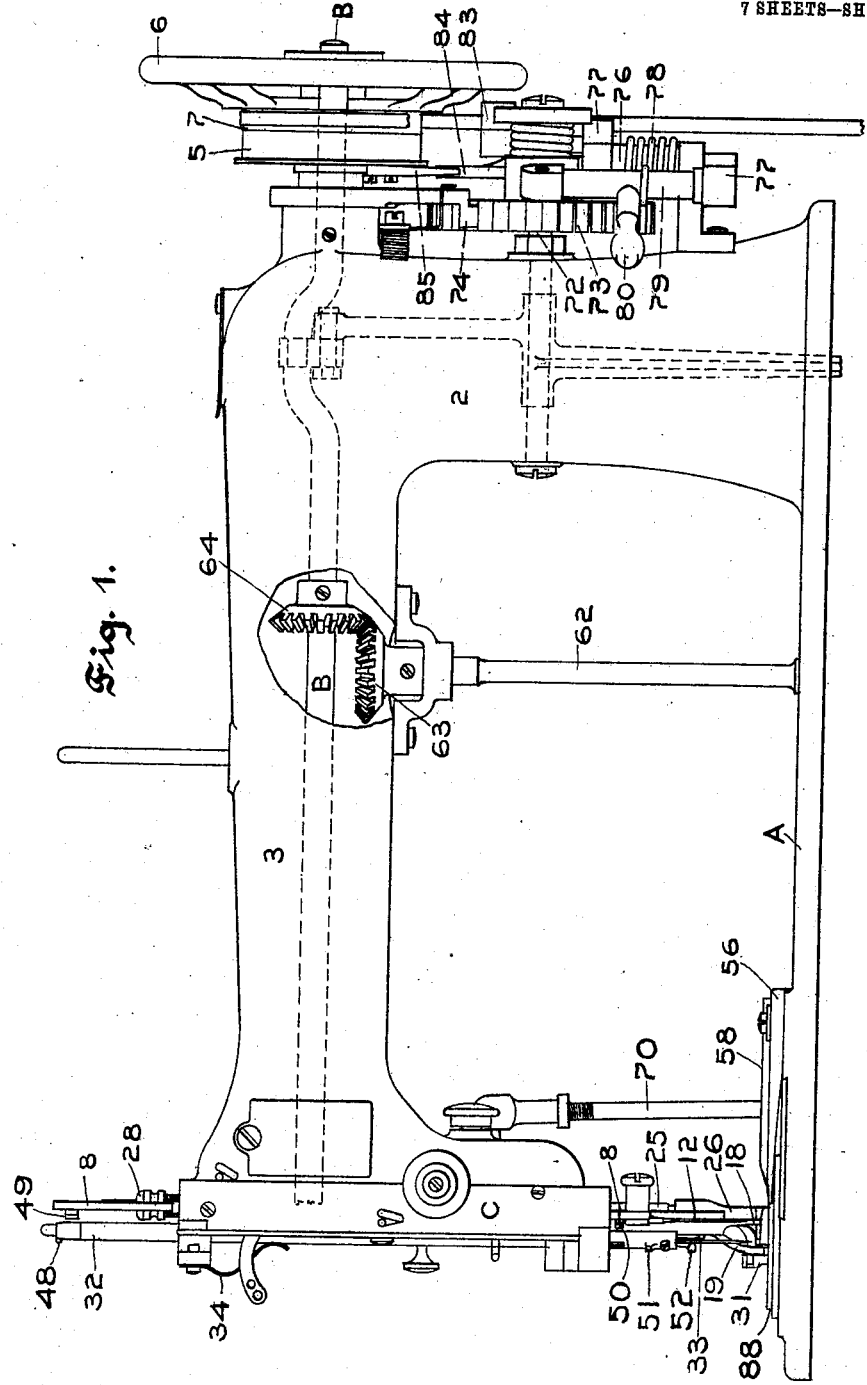
Figure 2:
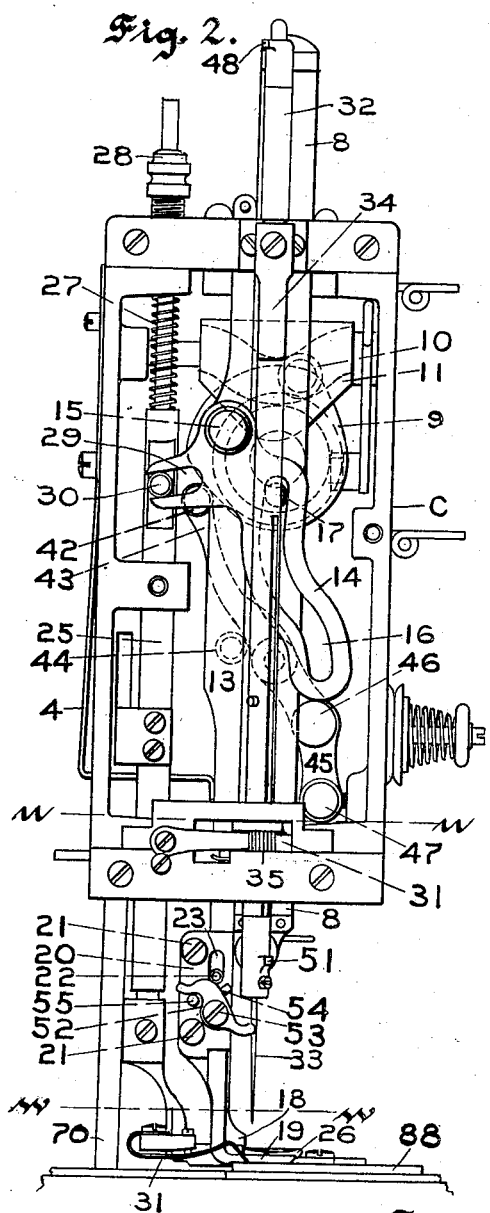
Figure 3:
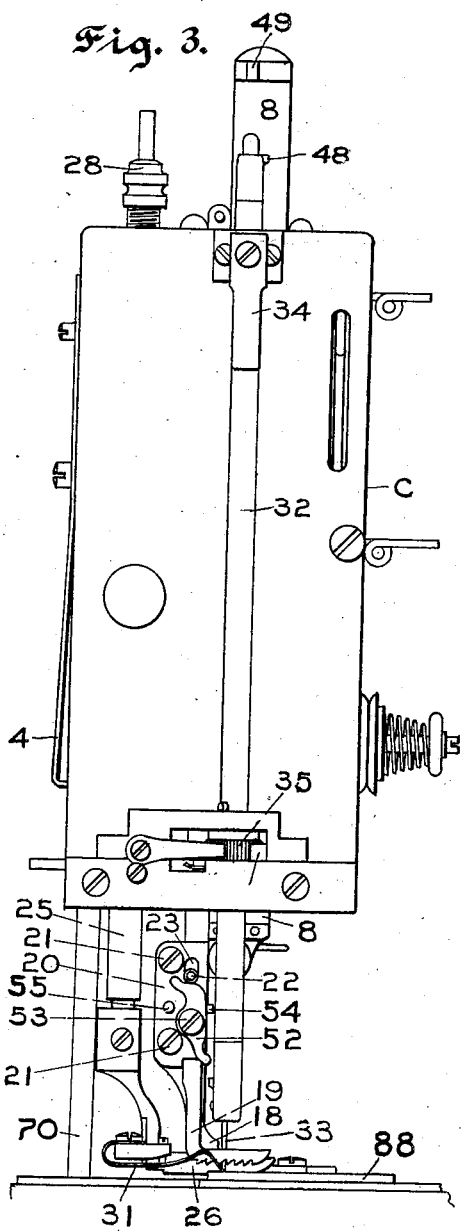
Figure 5:
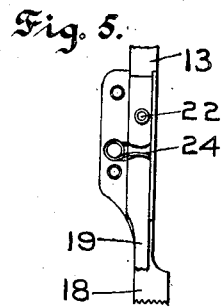
Figure 13:
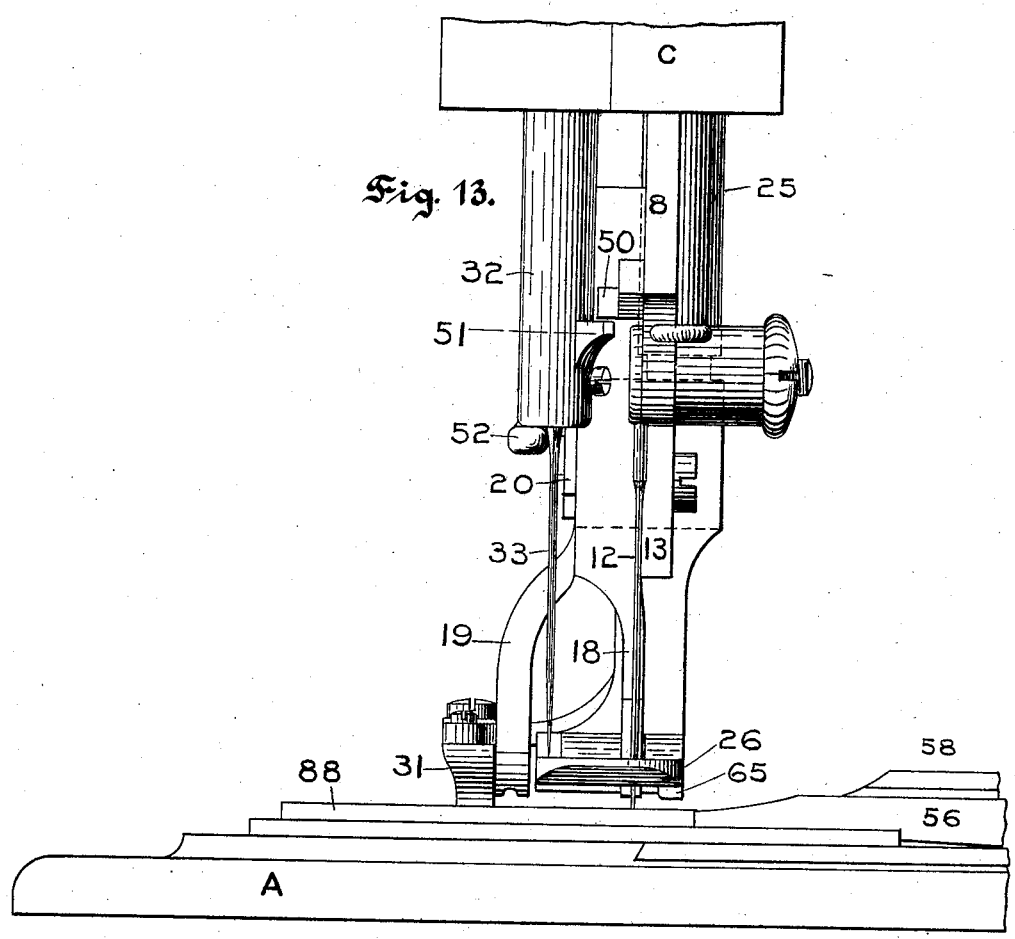
Figure 14:
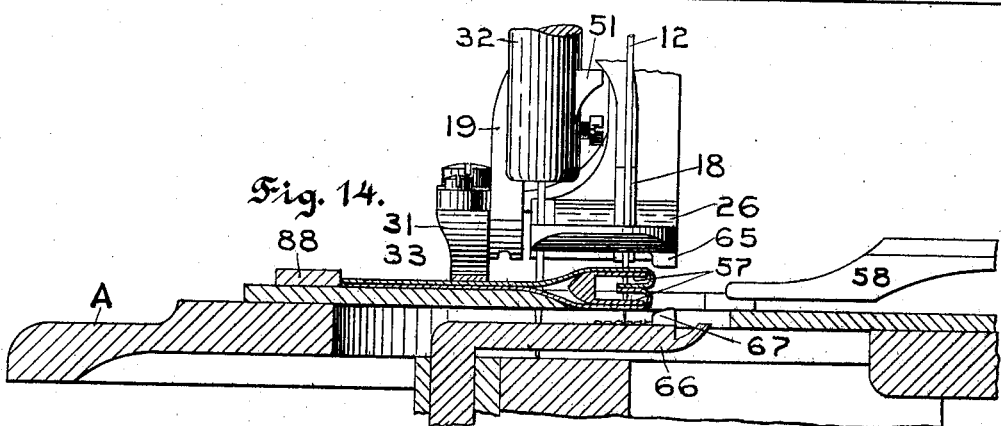
Figure 17:
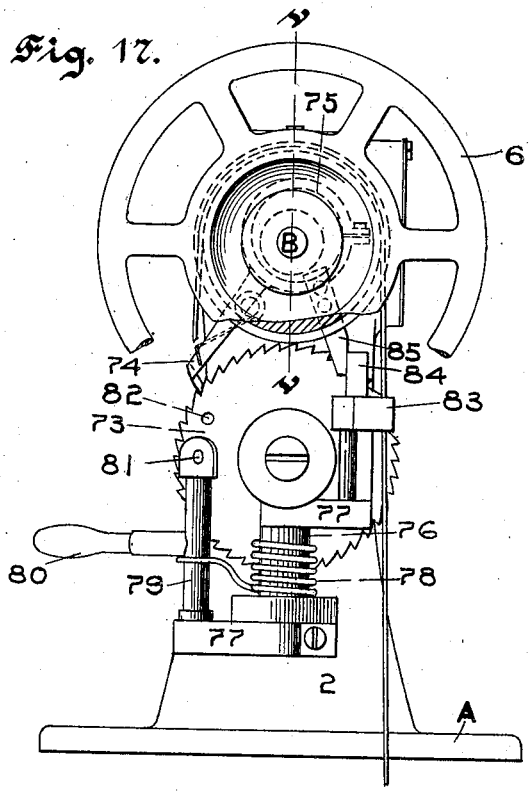
Figure 18:
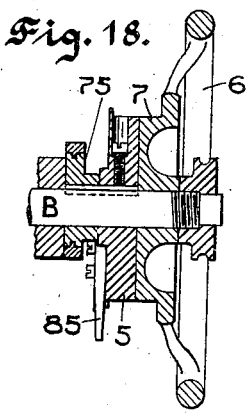
Figure 19:
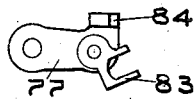
Figure 20:

In the accompanying drawings forming part of this specification, Figure 1 is a front elevation of my improved machine; Fig. 2 is an end elevation of the same with the covering plate removed; Fig. 3 is a similar view with the covering plate in place; Fig. 4 is a view on line $w$—$w$ of Fig. 2; Fig. 5 is a view showing a controlling spring for the feeder foot; Figs. 6 and 7 are sections on line $y$—$y$ of Fig. 4, Fig. 6 showing the turning mechanism withdrawn, and Fig. 7 showing the turning mechanism in operation; Fig. 8 is a section on line $u$—$u$ of Fig. 2; Fig. 9 is a plan view of the parts of the turning mechanism attached to the plate; Fig. 10 is a detail of the guides over which the edges of the material are turned; Figs. 11 and 12 are details of an under pressure plate forming part of the turning mechanism; Fig. 13 is a front elevation of the turning and sewing mechanism; Fig. 14 is a section on line $z$—$z$ of Fig. 4; Fig. 15 is a plan view of the bottom of the machine; Fig. 16 is a section on line $x$—$x$ of Fig. 15; Fig. 17 is an elevation of the fly-wheel end of the machine, showing the fly-wheel partly broken away; Fig. 18 is a section on line $v$—$v$ of Fig. 17; Fig. 19 is a detail of a belt shifter; Fig. 20 is a detail of part of the stop mechanism; Fig. 21 is a detail of a tab blank partly turned, and Fig. 22 is a detail of a completed tab.

In the drawings A represents a suitable bed or table upon which is supported the frame, consisting of an upright 2 and horizontal arm 3. The free end of the horizontal arm 3 supports the downwardly projecting head C, in which is arranged the needle bar and associated mechanism.

B represents the main driving shaft which has journal support in the arm 3 of the machine and is operated from a suitable source of power through the medium of the belt pulley 5. A fly-wheel 6 is loosely mounted upon the adjacent end of the shaft B and carries upon its inner side a pulley 7 alining with the pulley 5, as shown in Fig. 1. Slidably supported in the head C is the needle-bar 8, said needle-bar being given vertical movement by means of a cam 9 carried by the main driving shaft, said cam being provided with the roller 10, which projects into a curved groove in a block 11 secured upon the inner side of the needle-bar. The travel of the roller 10 in the groove of the block 11 caused by the turning of the driving shaft will vertically reciprocate the needle-bar. The needle-bar supports at its lower end a suitable needle 12. Slidably supported at the rear of the needle-bar is the feeder-bar 13. The feeder-bar is given vertical movement by means of a cam 14, having pivotal support 15 upon said feeder-bar and being provided with a curved slot 16 which receives a roller 17 projecting outwardly from the needle-bar, as shown in Fig. 2. The feeder-bar carries upon its lower end a feeder-foot 18. Slidably supported upon the outer side of the feeder-bar 13 is a supplementary feeder-foot 19. As shown in Figs. 2 and 3 the supplementary feeder 19 slides in a casing 20 which casing is secured to the lower end of the feeder-bar by screws 21. The supplementary feeder 19 is provided with an outwardly extending pin 22 projecting through the slot 23 in the casing 20. The feeder 19 is pressed downwardly by a spring 24.

Arranged in the rear of the needle-bar and feeder-bar is the presser-foot bar 25, carrying at its lower end an ordinary presser-foot 26. The presser-foot bar is pressed downwardly by a coil spring 27 and is provided with an adjusting nut 28. The presser-bar is lifted against the tension of the spring 27, by the cam 14, which is provided with a slot 29 to receive a pin 30 projecting outwardly from the presser-foot bar. Connected with the presser-foot is a spring 31 adapted to coöperate with the presser-foot in holding down the fabric.

For the purpose of serving as a pivot to turn the fabric upon, in the operation of the machine as hereinafter particularly described, I provide a bar 32 slidably supported upon the end of the head and carrying in its lower end a pin 33. The bar 32 normally stands raised, as shown in Fig. 2, being held in such raised position by a spring 34. The bar is given a step by step rotary movement by the mechanism shown in Fig. 8. As shown in Fig. 8 a ratchet-wheel 35 is slidably mounted upon the pivot bar 32. Having pivotal support 36 alongside the ratchet 35 is a lever 37, the inner end 38 of the lever standing against the rear side of the feeder-bar 13, and the forward end of the lever pivotally supporting by means of a screw 39, a dog 40, said dog engaging with the ratchet-wheel, as shown in Fig. 8. As the feeder-bar 13 is moved rearwardly in the operation of the machine, the lever 37 will be turned upon its pivotal support imparting a step by step movement to the pivot-bar by the dog 40 and ratchet 35. The ratchet is held from rearward movement by the spring controlled dog 41.

In order horizontally to reciprocate the needle-bar and feeder-bar the cam 9 works in connection with a roller 42, secured upon the upper end of a link 43. The side of the link opposite to the cam engages with a roller 44 carried by the feeder-bar. The link 43 has pivotal connection with a second link 45 which has central fulcrum support 46 in the head, and which carries at its lower end a roller 47 engaging with the forward side of the needle-bar, as shown in Fig. 2. As the upper end of the link 43 is turned rearwardly by the cam in the operation of the machine, its engagement with the roller 44 upon the feeder-bar and the engagement of the roller 47 with the needle-bar, will carry the feeder-bar and needle-bar to the rear, the reverse or forward movement of said bars, being accomplished by the spring 4.

In order to lift the pivot bar at a certain point in its rotation for the purpose hereinafter set forth, said bar is formed at its upper end with a laterally extending lug 48, and the needle-bar is formed with an outwardly extending lug 49. When the pivot-bar has been turned to bring the lug 48 in vertical alinement with the lug 49, the next upward movement of the needle-bar will raise the pivot bar to the position shown in Fig. 2. The pivot bar is thereafter lowered by means of a lug 50 projecting outwardly from the lower end of the needle-bar and which engages a lug 51 projecting from the lower end of the pivot-bar, when said lugs are in alinement, to throw said pivot bar into lowered position. As said pivot bar is carried to lowered position it will engage the lower end of a dog 52 having pivotal support 53 upon the outer side of the casing 20, turning said dog upon its pivot to engage with the pin 22 of the supplementary feeder-foot, raising and holding said feeder-foot in raised position, as shown in Fig. 3. When the pivot bar is again raised, its lowered lug 51 will engage with a lug 54, carried by the dog 52 to turn said dog rearwardly against the stop 55 to release the supplementary feeder-foot and to permit its being forced downwardly by its spring.

The edges of the material are turned inwardly before being stitched together, by the following mechanism: Secured upon the bed of the machine is a bar 56, carrying upon its inner end the rearwardly extending parallel guides or jaws 57. Slidably supported alongside said bar in position to work between said guides, as shown in Fig. 6, is the plunger 58. The plunger is supported upon a block 59 slidable under the bed of the machine, said block being connected by a rod 60 with an eccentric 61 upon the lower end of the shaft 62, the upper end of the shaft having gear connections 63 and 64 with the main driving shaft. The projecting edges of the fabric are bent over the guides 57 in position to be turned between the guides by the plunger, by the following described parts:

The presser-foot carries a downwardly projecting lug 65 which serves as a jaw to bend the projecting edge of the upper ply downward past the edge of the upper guide. Underneath the bed of the machine is supported a presser-foot or plate 66 carrying an upwardly extending lug 67 which projects through the bed of the machine and which serves as a jaw to bend the projecting edge of the lower ply of the fabric upward past the lower guide. The plate 66 is supported upon a standard 87 connected with one end of a lever 68 having fulcrum support 69 underneath the machine, the opposite end of said lever being connected by a rod 70 with the presser-foot bar, as illustrated in Fig. 1.

Supported underneath the bed of the machine in position to coöperate with the needle is a shuttle 71 of ordinary construction. The shuttle is operatively connected in the ordinary manner with the main driving shaft.

In order to throw the turning and sewing mechanism out of action when a tab is completed, I provide the mechanism shown in detail in Figs. 1 and 17. Loosely mounted upon a shaft 72 below the fly-wheel end of the main driving shaft, is a ratchet-wheel 73. The ratchet-wheel is given step by step movement in the rotation of the shaft by a pawl 74, carried by an eccentric 75 mounted upon the main driving shaft. Having fulcrum support 76 below the fly-wheel is a lever 77 normally held in the position shown in Fig. 1 by a spring 78. The lever 77 carries upon its forward end a standard 79 provided with a handle 80 and carrying from its upper end an inwardly projecting pin 81 which coöperates with the opening 82 in the ratchet-wheel. The rear end of the lever is provided with a belt shifter 83 which receives the belt, as shown in Fig. 17. The lever is also provided at its rear end with a bar 84 which engages the lug 85, carried by the driving pulley 5 to hold the main driving shaft against turning when the parts are in the position shown in Fig. 1.

Operation:—The plies of material to be joined to make the tab are placed in the machine, as shown in Fig. 6, the presser-feet being separated by pulling downwardly upon the loop 86. The lever 77 is then turned by the handle 80 to shift the belt from the fly-wheel to the main driving shaft, to turn the bar 84 out of engagement with the stop 85, and to release the pin 81 from the ratchet-wheel. The main driving shaft thus being set in operation will actuate the turning and sewing mechanism. In the operation of the machine the projecting edges of the material will first be bent over the guides by the lug 65 carried by the upper presser-foot, and the lug 67 carried by the lower presser-plate. The bent edges of the plies will then be thrust inward between the guides, as illustrated in Figs. 7 and 14. Alternately with the turning mechanism the needle and feeder-bar will be actuated vertically and horizontally, as heretofore described, to carry the needle through the inturned edges to form a stitch, and to engage with, and carry the fabic, rearwardly the length of one stitch into position for a second operation of the turning mechanism. The pivot bar, which was in raised position when the machine was started will, as heretofore described, be lowered by the needle-bar when the driving shaft has made a predetermined number of revolutions and a corresponding number of stitches. The parts are so adjusted that the pivot bar lowers at the point in the tab where the straight edge of the tab merges into the rounded portion. When the guide-bar lowers to carry its pivot-pin 33 through the fabric the supplementary feeder-foot will be raised through the medium of the dog 52, as heretofore described. The continued operation of the machine will swing the fabric upon the pivot-pin 33, the fabric being turned upon said pivot-pin by the main feeder-foot 18 which engages with the inner edge of the fabric. By the time the curved portion of the tab has been completed, the guide-bar will be raised, as heretofore described, again lowering the supplementary feeder-foot into contact with the fabric to thereafter coöperate with the main feeder-foot to carry the fabric in a straight line through the machine, and form the opposite straight edge of the tab. The parts are so adjusted that when the tab is completely made the ratchet-wheel will have completed one revolution, bringing the belt shifting and stop mechanism into the position shown in Fig. 1, automatically to stop the rotation of the main driving shaft. In order to assist the operator in placing the material in the machine, there is provided a gage plate 88.

The machine shown may be variously modified without departing from my invention, which consists in providing in connection with any desired means for turning inward, and stitching together, the edges of plies of fabric, suitable means for turning the fabric to permit the making of articles having a curved edge, like link cuff tabs.

Having now described my invention, what I claim as new, and desire to secure by Letters Patent, is:—

1. A machine of the class described, comprising in combination, means for holding independent plies of material in parallel position, means for drawing the same through the machine, a turner working between said holding means for inturning the edges of said material, sewing mechanism for joining said material through said inturned edges, a pivot-pin, means actuated from the sewing mechanism for raising and lowering said pin, and means for turning said material upon said pin when the same is in lowered position.

2. A machine of the class described, comprising in combination, means for holding two or more plies of material in parallel position, means for drawing the same through the machine, means for inturning the edges of said plies, a suitably actuated needle for joining said plies through said inturned edges, a pivot-pin arranged parallel with said needle, a needle bar, means actuated from the needle bar for raising and lowering said pin, and means for turning said material upon said pin when the same is in lowered position.

3. A machine of the class described, comprising in combination, means for holding two or more plies of material in parallel position, means for inturning the edges of said plies, a suitably actuated needle for stitching said plies through said inturned edges, a pair of feeders for carrying said material through said machine, a pivot-pin, and means for carrying said pivot-pin into lowered position and simultaneously carrying one of said feeders into raised position to permit the other feeder to turn said material upon said pin.

4. A machine of the class described, comprising in combination, means for holding two or more plies of material in parallel position, means for inturning the edges of said plies, means for stitching said plies through said inturned edges, a pivot-pin, means for raising and lowering said pivot-pin, feeding mechanism for carrying said material through the machine in a straight line when said pivot-pin is in raised position, and means for holding a portion of said feeding mechanism out of engagement with said material when the pin is lowered to permit the remainder of the feeding mechanism to turn said material upon said pin.

5. A machine of the class described, comprising in combination, means for holding two or more plies of material in parallel position, means for inturning the edges of said material, a needle arranged in position to stitch through said inturned edges, a needle-bar, a pivot-pin, a supporting bar therefor, coöperating lugs carried by said bars for raising and lowering said pivot-bar, and mechanism for carrying the material through the machine in a straight line when said pivot-pin is in raised position, and for turning said material upon said pin when the same is in lowered position.

6. A machine of the class described, comprising in combination, means for holding two or more plies of material in parallel position, means for inturning the edges of said material, sewing mechanism for joining said material through said inturned edges, a pivot-pin, means actuated by said sewing mechanism for raising and lowering said pivot-pin, feeder mechanism for carrying said material through the machine in a straight line when the pivot-pin is raised, and means actuated through the lowering of the pivot-pin to raise a part of said feeding mechanism to permit the remainder of said feeder mechanism to turn said material upon said pin.

7. A machine of the class described, comprising in combination, means for holding two or more plies of material in parallel position, step by step mechanism for inturning the edges of said material, a needle acting alternately therewith for joining said material through said inturned edges, a pivot-pin, means for imparting a step by step rotary movement to said pivot-pin to bring the same into position to be alternately raised and lowered by the needle mechanism, and feeding mechanism for carrying said material through the machine in a straight line when the pivot-pin is raised, and for turning said material upon said pin when the same is in lowered position.

8. Sewing mechanism having a needle, feed mechanism, pivot mechanism, means for automatically actuating said pivot mechanism, and means actuated through the lowering of the pivot mechanism, to raise a part of said feeding mechanism and permit the remainder of said feeding mechanism to turn said material upon said pivot mechanism.

9. A machine of the class set forth, comprising, in combination, suitably actuated sewing mechanism provided with a needle, means for holding two or more plies of material in the path of the needle, means for causing said plies to swing in the path of said needle on a right line, and in a predetermined curve, and means for imparting a step by step rotary movement to said swinging means to bring the same into position to be alternately raised and lowered.

10. Sewing mechanism having a needle, feeding mechanism, pivot mechanism having a pin and means for carrying said pin into lowered position and simultaneously raising part of said feeding mechanism to permit the remaining portion thereof to turn the material upon said pin.

In testimony whereof I affix my signature in presence of two witnesses.

PAUL P. BARTHOL.

Witnesses:
  H. S. JOHNSON,
  EMILY F. OTIS.